United States Patent
Liu et al.

(10) Patent No.: US 7,090,043 B2
(45) Date of Patent: Aug. 15, 2006

(54) GENERATING SYNGAS FOR NOX REGENERATION COMBINED WITH FUEL CELL AUXILIARY POWER GENERATION

(75) Inventors: Ke Liu, East Longmeadow, MA (US); Francis A. Kocum, Glastonbury, CT (US)

(73) Assignee: Shell Oil Company, Houston, TX (US)

( * ) Notice: Subject to any disclaimer, the term of this patent is extended or adjusted under 35 U.S.C. 154(b) by 326 days.

(21) Appl. No.: 10/717,088

(22) Filed: Nov. 19, 2003

(65) Prior Publication Data

US 2005/0103543 A1    May 19, 2005

(51) Int. Cl.
*B60K 1/00* (2006.01)
(52) U.S. Cl. .................. 180/65.2; 180/65.3
(58) Field of Classification Search .............. 60/272, 60/273, 274, 281, 282, 295, 297; 180/65.1, 180/65.2, 65.3, 65.4, 197; 701/71, 82, 87; 477/13, 57, 68, 168, 174, 176, 180
See application file for complete search history.

(56) References Cited

U.S. PATENT DOCUMENTS

| | | | | |
|---|---|---|---|---|
| 5,715,677 A | * | 2/1998 | Wallman et al. .............. 60/274 |
| 5,997,594 A | * | 12/1999 | Edlund et al. ................. 48/76 |
| 6,170,259 B1 | * | 1/2001 | Boegner et al. .............. 60/286 |
| 6,221,117 B1 | * | 4/2001 | Edlund et al. ................. 48/76 |
| 6,233,926 B1 | * | 5/2001 | Bailey et al. ................. 60/295 |
| 6,318,306 B1 | * | 11/2001 | Komatsu ....................... 123/3 |
| 6,475,268 B1 | * | 11/2002 | Thornton ....................... 96/11 |
| 6,506,510 B1 | * | 1/2003 | Sioui et al. ................... 429/17 |
| 2004/0175326 A1 | * | 9/2004 | Hershkowitz et al. ....... 423/652 |
| 2005/0045034 A1 | * | 3/2005 | Paglieri et al. ................ 96/10 |
| 2005/0123472 A1 | * | 6/2005 | Hall et al. ................... 423/651 |
| 2005/0176580 A1 | * | 8/2005 | Osaka et al. ................ 502/339 |

\* cited by examiner

*Primary Examiner*—Christopher P. Ellis
*Assistant Examiner*—Kelly E. Campbell

(57) ABSTRACT

During normal operation of a truck engine (12), a catalytic partial oxidizer (30) provides syngas (hydrogen and carbon monoxide) to regenerate NOx traps (35), for brief periods of time, or diverted (33) to the inlet (13) of an engine (12) via the EGR system (43–46). Some hydrogen is extracted from syngas by a palladium membrane separator (63) and passed to the fuel inlet (52) of a fuel cell stack (51). The stack (51) provides auxiliary electric power to the truck. Humid air from the air outlet (55) of the stack is provided to a fuel/exhaust/air static mixer (25). A methanator (66) may convert CO, leaked through the palladium membranes, into $CH_4$. Water/gas shift or steam reformer catalyst (76) at the inlet to or inside of the palladium membranes separator may provide some additional $H_2$.

4 Claims, 3 Drawing Sheets

GENERATING SYNGAS FOR NOX REGENERATION COMBINED WITH FUEL CELL AUXILIARY POWER GENERATION

TECHNICAL FIELD

This invention relates to combining, in vehicles having internal combustion engines, the application of a generated mix of hydrogen and carbon monoxide (syngas, hereinafter) to regenerate NOx adsorbent in NOx traps, and diverting some of the $H_2$ syngas to provide hydrogen-containing fuel to a fuel cell for auxiliary power generation in vehicles such as diesel trucks.

BACKGROUND ART

On vehicles having internal combustion engines, in order to reduce oxides of nitrogen (NOx) in the exhaust, it is known to produce a gaseous mixture of hydrogen and carbon monoxide (referred to hereinafter as syngas) for regeneration of adsorption material in NOx traps. The generation of syngas from engine fuel, engine exhaust and air, for use in regenerating NOx traps is disclosed in copending U.S. patent application Ser. No. 10/243,105, filed Sep. 13, 2002. Another example of such a system is illustrated in commonly owned copending U.S. patent application Ser. No. 10/309,712, filed Dec. 4, 2002.

In a prior art system shown in FIG. 1, an engine system 11 includes an internal combustion engine 12 which receives a mixture of fuel and air in a line 13. Air on a line 17 typically is provided by a turbo charger, the pressure of the air being suitably regulated by a valve 18. Fuel is provided on a line 19 from a fuel pump 20. The exhaust of the engine on a line 23 is provided through either a valve or a fixed orifice 24 to a static mixer 25 along with fuel from the line 19, which is passed through either a valve or a fixed orifice 26. The output of the static mixer on a line 29 is applied to a catalytic partial oxidizer (CPO) 30, which generates a gaseous mixture of hydrogen, carbon monoxide and other gases, all as is conventional and not relevant to the invention. The output of the CPO on a line 31 is applied to a two-way valve 33, although it could be a valve having more selections as is described elsewhere therein.

The exhaust on line 23 is also provided to syngas-utilizing apparatus, such as a set of valves 34 feeding a pair of NOx traps 35, which may be as disclosed in the aforementioned application Ser. No. 10/243,105, and may employ, for example, barium carbonate as the NOx adsorption material for reducing NOx emissions of an engine. The other input to the valves 34 is provided on a line 38 by one of the settings of the two-way valve 33. Thus, during the short period of time (5–10 seconds, typically) when the adsorbent material in one of the NOx traps is being regenerated by syngas, a signal 39 from a controller 40 will cause the two-way valve 33 to provide an effective amount of syngas to the valves 34; in this case, an effective amount is the amount needed to regenerate an NOx trap. The controller 40 switches the valves 34 back and forth by means of signals 41 so that each of the NOx traps alternatively adsorbs NOx in a larger period (typically on the order of 80–100 seconds) and then is regenerated by the syngas during the smaller period of time.

When syngas is not required, the controller 40, via the signal 39, will cause the setting of the two-way valve 33 to apply syngas to an EGR line 43 that receives exhaust through a conventional EGR valve 44 from the exhaust line 23. The EGR gas is cooled in a heat exchanger 45, passed through another conventional EGR valve 46 and thence mixed with the air/fuel mixture just before the combustion chamber of the engine 12. The EGR components 43–46 are conventional.

In the apparatus of FIG. 1, when the engine 12 is in normal operation, the CPO is allowed to function at its rated capacity, to continuously provide an effective or adequate amount of syngas. The output of the CPO is alternatively provided to the NOx traps 35 or diverted to the inlet of the engine 12. Since the heat value of the syngas is recovered in the engine, improving engine operation and reducing its unwanted emissions, the amount of fuel utilized to generate the syngas does not result in an efficiency loss of the overall engine system. By causing the CPO to operate continuously (during normal engine operation), there is no need to start up and shut down the CPO frequently; thus, the control of the CPO is simplified significantly, and the risk of damage to the CPO catalyst is minimized.

In large trucks, typically those powered with a diesel engine, the amount of electrical energy which is consumed at times requires an auxiliary power unit. Auxiliary power units currently available are very expensive, and the fuel processing systems required to power auxiliary power units is very complicated and expensive, and not practical for common use.

DISCLOSURE OF INVENTION

Objects of the invention include: a practical auxiliary power unit for large trucks; an auxiliary power unit which may be fueled in a cost-effective and efficient manner; an auxiliary power unit which is compatible and therefore capable of integration with other equipment auxiliary to the engine of a truck; and an improved auxiliary system for use in large trucks.

According to the present invention, a proton exchange membrane (PEM) fuel cell utilizes a portion of the $H_2$ produced by the CPO to provide the auxiliary electric power required by the truck system. According further to the invention, a palladium membrane is used to separate some hydrogen-containing gas, including a small amount of carbon monoxide, and carbon dioxide (COx), which is applied to a methanator to convert the gas to hydrogen containing a small amount of methane ($CH_4$). According to the invention, the syngas is produced by a catalytic partial oxidizer (CPO) which operates continuously, a portion of the syngas which is not removed by the palladium membrane is applied to regenerate NOx adsorbent during periods of regeneration, and is applied, through the EGR system to the fuel inlet of the engine during normal operation. When the engine is sitting at idle, the syngas may be diverted to other auxiliary equipment, such as a burner-driven air conditioning system to provide the energy needed for air conditioning of the truck.

According further to the invention, optionally, a small amount of COx leaks through the palladium membrane and is converted to $CH_4$ by a methanator, whereby the palladium membrane apparatus and the methanator can be quite small and inexpensive.

Humidification of air used by an on-board CPO is derived from the humidity in the air exhaust of a fuel cell stack. Thus, the fuel cell not only provides electric power, it also assists in generating the syngas (and $H_2$) by providing humidification of CPO inlet air.

Water injected into the syngas at the inlet of the palladium membrane separator may be extracted from the fuel cell air exhaust.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
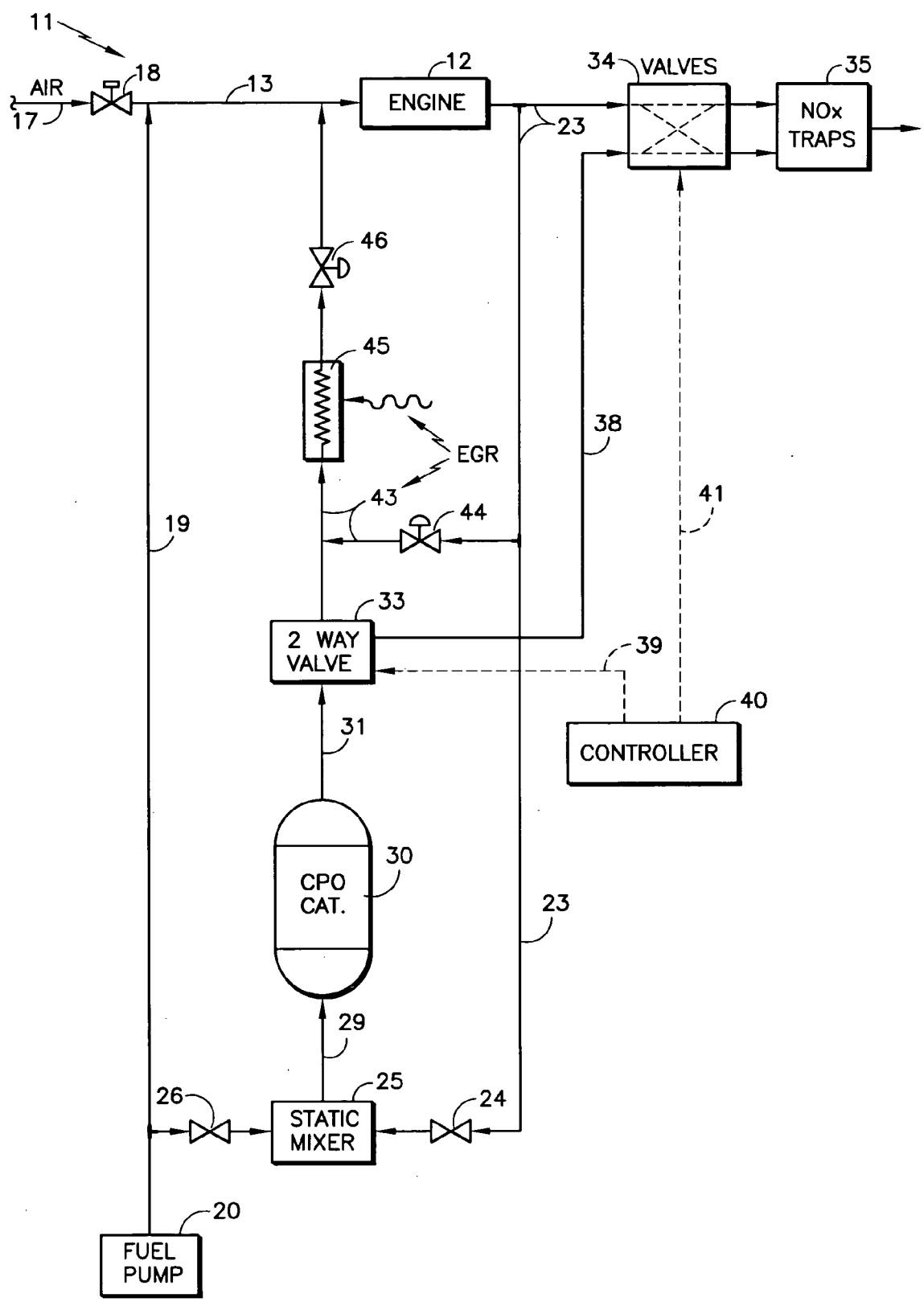
FIG. 1 is a simplified schematic of a prior art engine system which diverts the output of a CPO from NOx traps to a fuel inlet to the engine.
Figure 2:
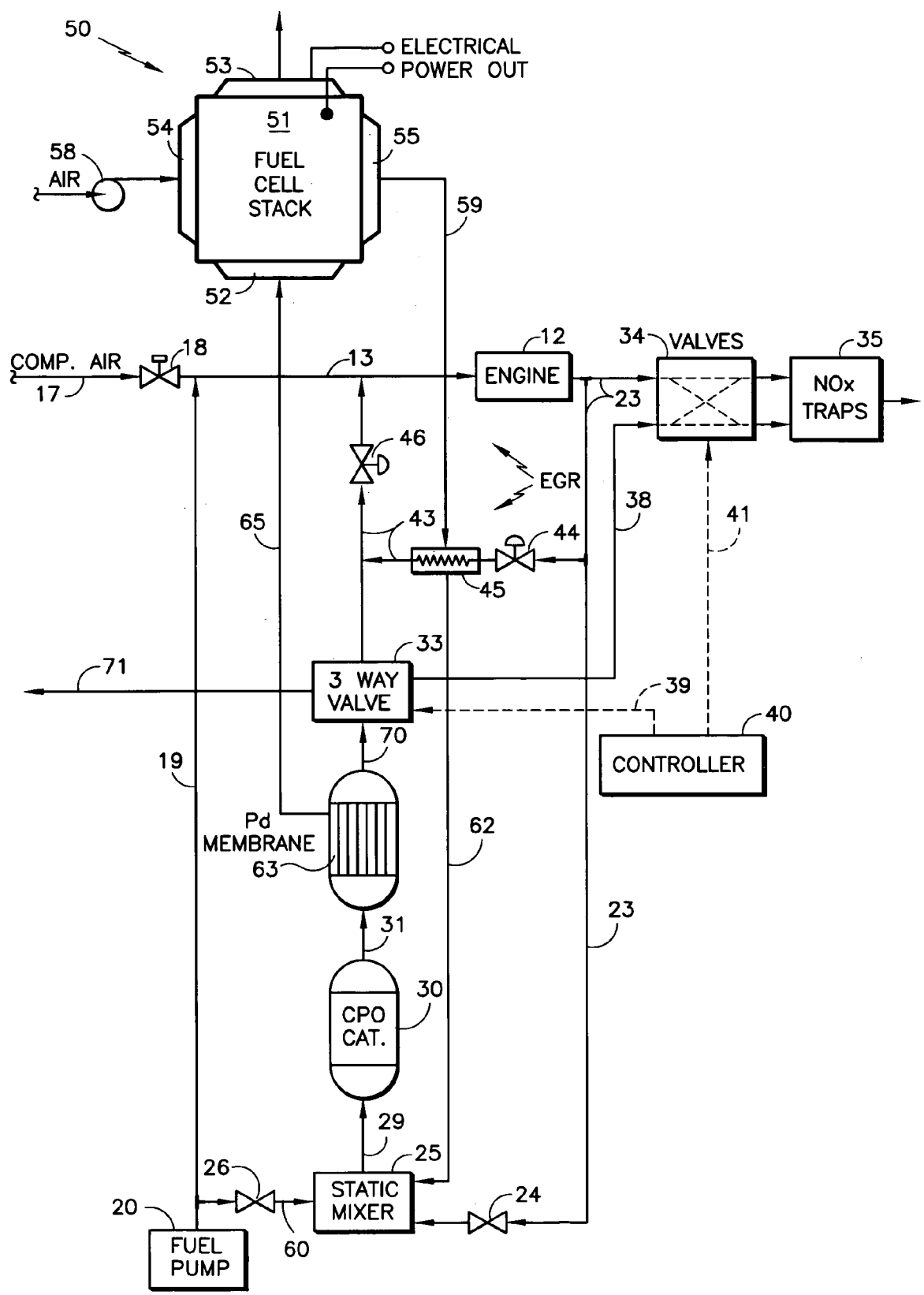
FIG. 2 is a schematic diagram of an engine system which combines a syngas generation function of FIG. 1 with a fuel cell stack auxiliary power unit, according to the present invention.

Referring to FIG. 2, the auxiliary power unit for a large truck, according to the present invention, comprises a fuel cell power plant 50 which includes a fuel cell stack 51 having a fuel inlet manifold 52, a fuel outlet manifold 53, an oxidant inlet manifold 54 and an oxidant outlet manifold 55. The fuel outlet manifold 53 may be interconnected with a fuel recycle apparatus as is known in the art, forming no part of the present invention; or the fuel outlet may be connected to the static mixer 25 at the fuel inlet 60 thereof. The oxidant inlet manifold 54 receives air, typically not compressed by more than 7–4 kPa (2–3 psi), from a blower 58; or it could be supplied by the compressor from air line 13.

The oxidant outlet manifold 55 is connected by a duct 59 to the heat exchanger 45 that cools the EGR flow as described hereinbefore. The air outlet of the heat exchanger 45 is applied by a duct 62 to the static mixer 25, thereby providing warm moist air at the inlet of the CPO, the heat from the EGR exhaust stream helping to raise the temperature of the humidified air feeding into the CPO 30 to about 300° C.–350° C. (572° F.–662° F.), for efficient operation. The syngas generated by the CPO 30, as described hereinbefore, is applied by the duct 31 to the input of a palladium membrane separation unit 63. This provides hydrogen in a duct 65 to the fuel inlet 52 of the fuel cell stack 51.

The principal output of the palladium membrane separator 63 in a duct 70 comprises hydrogen with small amounts of CO, $CO_2$ and other unconverted hydrocarbons. This is applied to a three-way valve 33 so that when the engine is simply idling, the hydrogen may be supplied over a line 71 to various auxiliary equipment, such as a burner-driven air conditioning system. When the engine is operating normally (that is, pulling the load) the three-way valve will be set for short periods of time (on the order of 5–10 seconds) to provide the syngas over the line 38 to the valves 34; but when the NOx adsorbent is not being regenerated (such as periods of 80–100 seconds between the regeneration periods) and the engine is operating normally, the three-way valve is set to provide the syngas over the line 43 to mix with the EGR at the inlet to the engine 12.

Figures 3, 4:
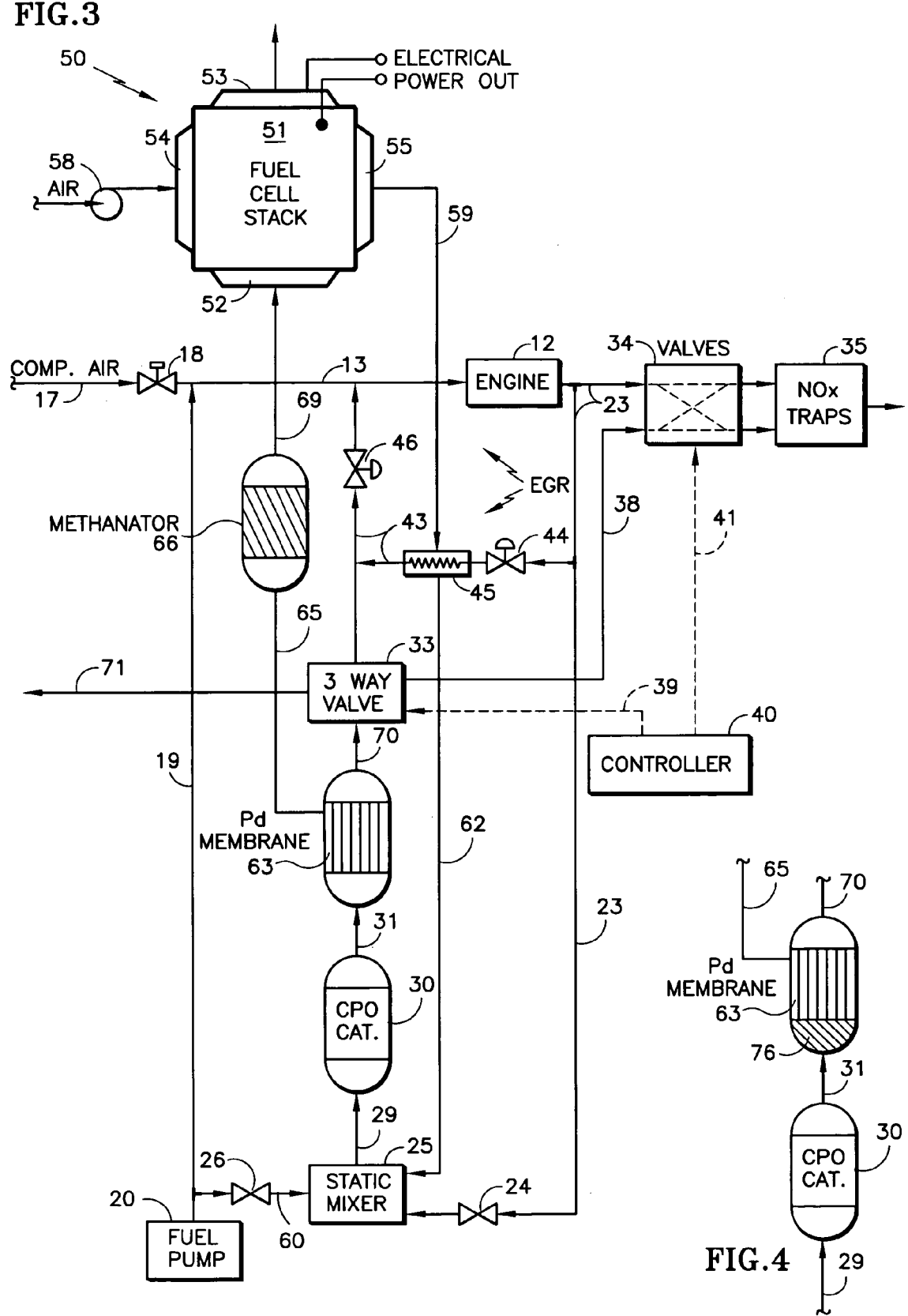
FIG. 3 is a schematic diagram of the system of FIG. 2 with a methanator that allows use of a less expensive, thinner Pd membrane in a separator.
FIG. 4 is a partial schematic diagram illustrating addition of a catalyst to the Pd membrane.

If desired, to have a system which is less expensive overall, thinner, less expensive palladium membranes may be used in the separator 63. This however will permit a small amount of syngas including CO to leak through the membranes, thereby providing in the conduit 65 a mixture of hydrogen and small amounts of CO. The CO poisons the anode catalyst in the fuel cell, as is known. As shown in FIG. 3, the palladium membrane separator 63 provides hydrogen and COx in the duct 65 to a methanator 66. The methanator 66 may comprise a Pt—Ru catalyst, as is known. In the methanator 66, the CO is converted to $CH_4$, which is innocuous to the fuel cell stack. The $CH_4$ heat value may be recovered by recycling back to the CPO 30, if the fuel outlet 53 is connected to the static mixer 25, or by burning in the engine 12.

As illustrated in FIG. 4, if desired, a catalyst 76 may be provided inside of, or at the input to the palladium membrane separator 63. The catalyst may either be a water/gas shift reactor catalyst or a steam reforming reactor catalyst. In such a case, the required amount of syngas, in order to regenerate the NOx traps and to provide hydrogen to the fuel cell stack, may be provided partly by the CPO 30 (such as, on the order of about 70%) and partly by the catalyst 76 (such as on the order of about 30%).

If desired or found unnecessary, air may be supplied directly to the inlet 60 of the static mixer 25, particularly during startup or even during steady state conditions, if necessary in any given implementation of the present invention. In addition, the hot exhaust in line 23 can be used during start up of the CPO before the fuel cell stack air exhaust becomes sufficient.

Although not necessary, if desired, water may be injected into the output 31 of the CPO 30 at the inlet to the palladium membrane separator 63, to help cool the syngas to less than 400° C. (−752° F.). The water may be supplied in a variety of ways, the simplest being from a tank of water (not shown), or from the fuel cell stack 51.

Instead of using a pair of alternatively regenerated NOx traps 35, the invention may be practiced utilizing a continuously adsorbing and regenerated NOx trap having mutually rotating adsorbent and inlet manifold that distributes exhaust and syngas in proportion to the time it takes to saturate the adsorbent and the time it takes to regenerate the adsorbent, as disclosed in copending U.S. patent application Ser. No. 10/159,369, filed May 31, 2002.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A vehicle comprising:
    an oxides-of-nitrogen (NOx) trap assembly having an adsorption material which is regenerated with a mixture including hydrogen and carbon monoxide (syngas);
    a fuel cell power plant receiving air at an air inlet, receiving a hydrogen rich fuel mixture at a fuel inlet, and having humidified air exhausting from an air exit, said fuel cell power plant providing electrical power to operate auxiliary apparatus in said vehicle;
    an internal combustion engine system which operates on engine fuel and provides engine exhaust having NOx therein to said NOx trap assembly;
    means for generating syngas from said engine exhaust, said engine fuel and humidified air exhausting from said fuel cell power plant, in an amount in excess of that required to regenerate adsorption material in said NOx trap assembly; and a palladium membrane separator receiving at its input syngas and (a) providing syngas from a main output thereof for use in regenerating said adsorption material, and (b) providing a hydrogen rich gas mixture from an additional output of said separator to said fuel inlet of said fuel cell stack.

2. A vehicle according to claim 1 wherein:
said palladium membrane separator has membranes that may leak some syngas including CO from said additional output; and further comprising:
a methanator, the hydrogen rich gas mixture from said additional output of said palladium membrane separator being applied to said methanator wherein the CO is converted to $CH_4$, the output of said methanator being applied to the fuel inlet of said fuel cell stack.

3. A vehicle according to claim 1 further comprising:
a catalyst, selected from a water/gas shift reactor catalyst and a steam reformer reactor catalyst, disposed between the output of said means for generating syngas and the membranes of said palladium membrane separator, whereby said amount of syngas is provided partly by said means for generating syngas and partly by said catalyst.

4. A vehicle according to claim 1, further comprising:
means for diverting syngas that is not utilized to regenerate the NOx trap catalyst from said main output of said separator to either (a) the engine or (b) a burner-driven air conditioning system.

* * * * *